(12) United States Patent
Muldoon et al.

(10) Patent No.: US 8,354,193 B2
(45) Date of Patent: Jan. 15, 2013

(54) ELECTROLYTE FOR A MAGNESIUM SULFUR BATTERY

(75) Inventors: John Muldoon, Saline, MI (US); Hee Soo Kim, Ann Arbor, MI (US); Masaki Matsui, Ann Arbor, MI (US)

(73) Assignee: Toyota Motor Engineering & Manufacturing North America, Erlanger, KY (US)

( * ) Notice: Subject to any disclaimer, the term of this patent is extended or adjusted under 35 U.S.C. 154(b) by 103 days.

(21) Appl. No.: 12/758,343

(22) Filed: Apr. 12, 2010

(65) Prior Publication Data
US 2011/0244338 A1    Oct. 6, 2011

(51) Int. Cl.
  *H01M 10/054*   (2010.01)
  *H01M 10/056*   (2010.01)
  *H01M 4/13*   (2010.01)

(52) U.S. Cl. ............... 429/231.5; 429/218.1; 429/188; 429/336; 429/337; 429/199

(58) Field of Classification Search ............ 429/188, 429/199, 218.1, 231.5, 336, 337
See application file for complete search history.

(56) References Cited

U.S. PATENT DOCUMENTS

| | | | |
|---|---|---|---|
| 3,658,592 A | 4/1972 | Dey | |
| 3,849,868 A | 11/1974 | Jost | |
| 4,020,242 A | 4/1977 | Okazaki et al. | |
| 5,506,072 A | 4/1996 | Griffin et al. | |
| 6,030,720 A | 2/2000 | Chu et al. | |
| 6,265,109 B1 | 7/2001 | Yamamoto et al. | |
| 6,420,067 B1 | 7/2002 | Yoshioka | |
| 6,733,924 B1 | 5/2004 | Skotheim et al. | |
| 7,029,796 B2 | 4/2006 | Choi et al. | |
| 7,189,477 B2 | 3/2007 | Mikhaylik | |
| 7,316,868 B2 | 1/2008 | Gorkovenko | |
| 2008/0182176 A1* | 7/2008 | Aurbach et al. | 429/337 |
| 2009/0068568 A1 | 3/2009 | Yamamoto et al. | |
| 2009/0226809 A1 | 9/2009 | Vu et al. | |

FOREIGN PATENT DOCUMENTS

| | | |
|---|---|---|
| JP | 2004-265675 | 9/2004 |
| JP | 2004259650 A | 9/2004 |
| JP | 2005-243321 | 9/2005 |

OTHER PUBLICATIONS

Liebenow et al., "The electrodeposition of magnesium using solutions of organomagnesium halides, amidomasgnesium halides and magnesium organoborates", Electrochemistry Communications 2 (2000) 641-645.*
Muldoon et al. "Electrolyte roadblocks to a magnesium rechargeable battery", Energy & Environmental Science, The Royal Society of Chemistry 2012 (www.rsc.org/ees).*
U.S. Appl. No. 12/768,017, filed Apr. 27, 2010, Muldoon, et al.

(Continued)

Primary Examiner — Barbara Gilliam
Assistant Examiner — Edu E Enin-Okut
(74) Attorney, Agent, or Firm — Oblon, Spivak, McClelland, Maier & Neustadt, L.L.P.

(57) ABSTRACT

An electrochemical device, having an anode containing magnesium; a cathode stable to a voltage of at least 3.2 V relative to a magnesium reference; and an electrolyte obtained by admixture of a magnesium salt of a non-nucleophilic base comprising nitrogen and aluminum trichloride in an ether solvent is provided. As sulfur is stable to a voltage of at least 3.2 V relative to a magnesium reference, a magnesium-sulfur electrochemical device is specifically provided.

14 Claims, 6 Drawing Sheets

1. Mg reference electrode
2. Working electrode
3. PTFE tube
4. Mg counter electrode
5. Electrolyte
6. S/C paste

OTHER PUBLICATIONS

Doron Aurbach, et al. "Nonaqueous Magnesium Electrochemistry and Its Application in Secondary Batteries" The Chemical Record, vol. 3, (pp. 61-73) 2003.

Z. Lu, et al. "On the Electrochemical Behavior of Magnesium Electrodes in Polar Aprotic Electrolyte Solutions" Journal of Electroanalytical Chemistry, vol. 466, (pp. 203-217) 1999.

D. Aurbach, et al. "Prototype Systems for Rechargeable Magnesium Batteries" Nature, vol. 407, (pp. 724-727) 2000, www.nature.com.

C. Liebenow, et al. "The Electrodeposition of magnesium Using Solutions of Organomagnesium Halides, Amidomagnesium Halides and Magnesium Organoborates" Electrochemistry Communications vol. 2, (pp. 641-645) 2000.

Thomas D. Gregory, et al. "Nonaqueous Electrochemistry of Magnesium" J. Electrochem. Soc., vol. 137, No. 3, (pp. 775-780), 1990.

U.S. Appl. No. 13/198,580, filed Aug. 4, 2011, Muldoon, et al.

* cited by examiner

1. Mg reference electrode
2. Working electrode
3. PTFE tube
4. Mg counter electrode
5. Electrolyte
6. S/C paste

ELECTROLYTE FOR A MAGNESIUM SULFUR BATTERY

BACKGROUND OF THE INVENTION

1. Field of the Invention

The present invention relates to an electrochemical device having an anode containing magnesium, a cathode stable to a voltage of at least 3.2 V relative to a magnesium reference; and an electrolyte of a magnesium salt of a non-nucleophilic base comprising nitrogen and aluminum trichloride in an ether solvent. Most specifically the invention is directed to a magnesium sulfur electrochemical device having an electrolyte which is compatible with a magnesium anode and a sulfur cathode.

2. Discussion of the Background

Lithium ion batteries have been in commercial use since 1991 and have been conventionally used as power sources for portable electronic devices. The technology associated with the construction and composition of the lithium ion battery (LIB) has been the subject of investigation and improvement and has matured to an extent where a state of art LIB battery is reported to have up to 700 Wh/L of energy density. However, even the most advanced LIB technology is not considered to be viable as a power source capable to meet the demands for a commercial electric vehicle (EV) in the future. For example, for a 300 mile range EV to have a power train equivalent to current conventional internal combustion engine vehicles, an EV battery pack having an energy density of approximately 2000 Wh/L is required. As this energy density is close to the theoretical limit of a lithium ion active material, technologies which can offer battery systems of higher energy density are under investigation.

Magnesium as a multivalent ion is an attractive alternate electrode material to lithium, which can potentially provide very high volumetric energy density. It has a highly negative standard potential of −2.375V vs. RHE, a low equivalent weight of 12.15 g/mole of electrons and a high melting point of 649° C. Compared to lithium, it is easy to handle, machine and dispose. Because of its greater relative abundance, it is lower in cost as a raw material than lithium and magnesium compounds are generally of lower toxicity than lithium compounds. All of these properties coupled with magnesium's reduced sensitivity to air and moisture compared to lithium, combine to make magnesium an attractive alternative to lithium as an anode material.

Sulfur is an attractive cathode material due to its ready availability, low cost, relative nontoxicity and low equivalent weight. Additionally, sulfur has a theoretical maximum capacity of 1675 mAh/g. Therefore, sulfur used as a cathodic material in combination with a magnesium anode could provide a high capacity, safe and economic battery, potentially suitable for use in EV.

Production of a battery having an anode based on magnesium as the active material and a cathode based on sulfur as the active material, requires an electrolyte system which will efficiently transport magnesium ions and which will not adversely affect a sulfur cathode active material. In performance as a cathode active material sulfur is reduced to sulfide and polysulfide discharge products. These discharge products must remain available for oxidation during a charging stage. Moreover, to obtain a viable magnesium sulfur battery, an effective Mg electrolyte transport system cannot be chemically reactive to sulfur.

The electrochemical behavior of a magnesium electrode in a polar aprotic electrolyte solution was reported by Lu et al. in the Journal of Electroanalytical Chemistry (466 (1999) pp 203-217). These authors concluded that the electrochemical behavior of Mg is different from that of Li in polar aprotic electrolyte solutions. Their investigation showed that in contrast to the case of lithium electrodes, surface films which form on the Mg electrode in the aprotic solvents do not transport Mg ions. Therefore, conventional electrolyte systems employed in lithium transport systems are not suitable for a cell having a magnesium anode. Since Mg ion transport is an essential requirement for any electrochemical cell based on a magnesium anode, other electrolyte systems have been investigated.

Gregory et al. (J. Electrochem. Soc., 137 (3), March, 1990, 775-780) reported electrolyte systems of alkylmagnesium halide-organoboron complexes in an ether solvent. Also reported were alkylmagnesium halide solutions to which aluminum halides were added. Mg dissolution and plating at very high current efficiencies, giving bright crystalline Mg deposits were obtained in these systems. However, a suitable cathode material, compatible with the electrolyte system was not reported.

The most commonly used magnesium electrolyte to date is an organometallic material such as phenyl magnesium chloride/aluminum chloride in tetrahydrofuran. However, these electrolyte mixtures are not likely to be of practical commercial utility due to air and moisture sensitivity characteristic of such Grignard-based materials. Moreover, the phenyl magnesium chloride/aluminum chloride electrolyte has limited anodic stability, and significantly, such materials are highly nucleophilic and intrinsically strong reducing agents. This chemical reactivity character is problematic, because to construct an electrochemical cell employing a Grignard type electrolyte, a cathode material which is essentially chemically inert to the Grignard is required. The number of cathode functional materials meeting this requirement are limited. To date there have been two demonstrated cathodes which are compatible with organometallic electrolytes.

Aurbach et al. (NATURE, 407, Oct. 12, 2000,724-726) describes an Mg battery system containing a magnesium organohaloaluminate salt in tetrahydrofuran (THF) or a polyether of the glyme type as electrolyte and a $Mg_xMo_3S_4$ cathode based on a $Mo_3S_4$ Chevrel phase host material. A similar cathode material described as having a formula $Mg_{(0-2)}Mo_6S^{(8-n)}Se_n$ was also reported by Aurbach (Advanced Materials, 19, 2007, 4260-4267).

Yamamoto et al. (JP2007-233134) describe positive electrode active substances containing fluoro graphite or an oxide or halide of a metal element such as scandium, titanium, vanadium, chromium, manganese iron, cobalt, nickel, copper and zinc. The experimental examples are based on $MnO_2$.

However, the organometallic electrolytes employed in the above magnesium electrolyte systems are highly reactive with sulfur and are known to directly react with sulfur to form sulfides by nucleophilic attack (The Chemistry of the Thiol Group, Pt 1; Wiley, New York, 1974, pp 211-215). Therefore, in order to produce a Mg/S battery, a new electrolyte system which meets all the requirements for magnesium ion transport described previously while having low or no chemical reactivity toward sulfur is required.

U.S. Pre-Grant Publication No. 2009/0226809 to Vu et al. describes a cathode for a lithium-sulfur battery (Abstract). A metal oxide selected from Group I and II metals is included in the composition of a sulfur cathode composition [0012]. The anode contains lithium and the electrolyte described is composed of a lithium salt in a nonaqueous solvent system [0032].

U.S. Pre-Grant Publication No. 2008/0182176 to Aurbach et al. describes an electrochemical cell having a magnesium anode and an intercalation cathode having a modified Chevrel phase. The Chevrel phase compound is represented by the formula $Mo_6S_{8-y}Se_y$ (y is greater than 0 and less than 2) or $M_xMo_6S_8$ (x is greater than 0 and less than 2). The electrolyte is represented by the formula $Mg(AlR_xCl_{4-x})_2$ and/or (Mg $R_2)_x$-$(AlCl_{3-n}R_n)_y$, wherein R is methyl, ethyl, butyl, phenyl and derivatives thereof, n is greater than 0 and lower than 3, x is greater than 0 and lower than 3 and y is greater than 1 and lower than (claim 3) in an ether solvent.

U.S. Pat. No. 7,316,868 to Gorkovenko describes an electrochemical cell having a lithium anode, a cathode of an electroactive sulfur containing composition and a nonaqueous electrolyte containing a lithium salt and a solvent mixture of dioxolane and one or more of 1,2-dialkoxyalkanes of 5 or 6 carbons and 1,3-dialkoxyalkanes of 5 or 6 carbon atoms (claim 1). Electroactive sulfur compounds include elemental sulfur and organic compounds having sulfur and carbon atoms (Col. 4, lines 10-26).

U.S. Pat. No. 7,189,477 to Mikhaylik describes an electrochemical cell having a lithium anode, a cathode of a sulfur containing material and an electrolyte system composed of a lithium salt (Col. 4, lines 5-22) and a non-aqueous oxygen containing organic solvent selected from acyclic ethers, cyclic ethers, polyethers and sulfones.

U.S. Pat. No. 7,029,796 to Choi et al. describes a lithium sulfur battery having a cathode of an agglomerated complex of sulfur and conductive agent particles (claim 1). A solid or liquid electrolyte can be employed and a liquid electrolyte is a nonaqueous organic solvent and a lithium salt (Col. 8, lines 43-58).

U.S. Pat. No. 6,733,924 to Skotheim et al. describes lithium sulfur battery wherein the lithium is protected by a surface coating of a metal such as copper, magnesium, aluminum, silver, etc. (Col. 12, lines 25-28). The electrolyte may be comprised of ionic salts in a non-aqueous solvent, gel polymer or polymer. Ionic electrolyte salts are lithium salts (Col. 15, line 26 to Col. 16, line 27).

U.S. Pat. No. 6,420,067 to Yoshioka describes a hydrogen storage negative electrode being a Mg alloy of Ni, Zn, and Zr (Abstract). The positive electrode is composed of a metal oxide (Col. 3, lines 17-19) and an aqueous electrolyte Col. 7, lines 16-18).

U.S. Pat. No. 6,265,109 to Yamamoto et al. describes air batteries with a negative electrode of a magnesium alloy (Col. 4, lines 9-33). The electrolyte is composed of an acid amide and a second solvent selected from dimethyl acetoamide, acetonitrile, ethylene carbonate, propylene carbonate and γ-butyrolactam (Col. 3, lines 1-15) and magnesium salt of a halogenide or a perchlorate.

U.S. Pat. No. 5,506,072 to Griffin et al. describes a battery having a cathode of finely divided sulfur and finely divided graphite packed about a solid graphite electrode (Col. 3, lines 48-51), an anode containing magnesium and an electrolyte of a corresponding magnesium halide and ionic sulfide as an aqueous electrolyte solution (Col. 3, line 65-Col. 4, line 1).

U.S. Pat. No. 4,020,242 to Okazaki et al. describes a primary cell containing a spacer which contains electrolyte and reduces its apparent volume when pressure is applied by volume increase of the cathode or anode (Abstract). A cell composed of a lithium anode and a cathode of carbon fluoride, silver chromate, manganese dioxide, cupric oxide or vanadium pentoxide and a nonaqueous electrolyte is described (claim 15).

U.S. Pat. No. 3,849,868 to Jost describes a battery having a container of a composite metal laminate having a layer of magnesium bonded to a laminate material (Abstract). A graphite rod serves as the cathode (Col. 4, line 66 to Col. 5, line 3) and an electrolyte mixture contains manganese dioxide, finely divided carbon and a chromate in an aqueous solution of a bromide salt (Col. 4, lines 48-59).

U.S. Pat. No. 3,658,592 to Dey describes an electric cell having an anode of a light metal (Col. 1, lines 63-67), a cathode of a metal chromate (Col. 1, lines 68-72) and a non-aqueous electrolyte containing inorganic salts of light metals in organic solvents (Col. 1, line 73 to Col. 2, line 9). Magnesium is listed as a light metal.

JP 2004-259650 to Fumihito describes a battery having a magnesium anode and an intercalation cathode of a transition metal (Abstract). A cathode of vanadium pentoxide and graphite is described in Example 1. The electrolyte is a polymer gel containing a phenyl magnesium halide in tetrahydrofuran.

JP 2004-265675 to Hideyuki et al. describes a test cell constructed with a sulfur containing anode and a negative electrode of magnesium metal. Magnesium bis(trifluoromethylsulfonyl)imide in γ-butyrolactone is employed as an electrolyte system.

Aurbach et al. (The Chemical Record, Vol. 3, 61-73 (2003)) describes a study of a $(Bu_2Mg)_x$-$(AlCl_2Et)_y$ system in tetrahydrofuran and reports isolation of single crystals which were identified by XRD analysis as having the following structure:

Aurbach reports that the isolated crystals were inactive with regard to magnesium deposition and describes that Mg could be reversibly deposited from the residual solutions remaining after removal of the precipitated crystals.

None of the above documents discloses a practically functional electro-chemical device having an anode containing a magnesium, a cathode containing sulfur and an electrolyte system which is effective for the transport of Mg ions and compatible both with an Mg containing active material electrode and also a sulfur containing active material electrode.

SUMMARY OF THE INVENTION

This and other objects, individually or in combinations thereof, have been achieved by the present invention, a first embodiment of which includes an electrochemical device, comprising:
an anode comprising magnesium;
a cathode stable to a voltage of at least 3.2 V relative to a magnesium reference; and
an electrolyte;
wherein the electrolyte is obtained by admixture of a magnesium salt of a non-nucleophilic base comprising nitrogen and aluminum trichloride in an ether solvent.

A second embodiment of the present invention provides an electrochemical device, comprising:
an anode comprising magnesium;
a cathode stable to a voltage of at least 3.2 V relative to a magnesium reference; and an electrolyte;
wherein the electrolyte comprises tetrahydrofuran, and an active salt of formula (I)

(I)

A third embodiment of the present invention provides an electrochemical device, comprising:
an anode comprising magnesium;
a cathode containing sulfur; and
an electrolyte;
wherein the electrolyte comprises tetrahydrofuran, and an active salt of formula (I)

(I)

A fourth embodiment of the present invention provides a method for preparing an electrochemical device, comprising:
connecting an anode comprising magnesium and a cathode stable to a voltage of at least 3.2 V relative to a magnesium reference via an external electrically conductive structure; and
contacting the anode and cathode with an electrolyte comprising:
a magnesium salt of a non-nucleophilic base comprising nitrogen;
aluminum trichloride; and
an ether solvent.

A fifth embodiment of the present invention provides a method for preparing an electrochemical device, comprising:
connecting an anode comprising magnesium and a cathode comprising sulfur via an external electrically conductive structure; and
contacting the anode and cathode with an electrolyte comprising: tetrahydrofuran, and
an active salt of formula (I)

(I).

The foregoing paragraphs have been provided by way of general introduction, and are not intended to limit the scope of the following claims. The presently preferred embodiments, together with further advantages, will be best understood by reference to the following detailed description taken in conjunction with the accompanying drawings.

DETAILED DESCRIPTION OF THE INVENTION

It is an object of the present invention to provide an electrochemical device having magnesium as an active anode material and a nonaqueous electrolyte system which is of low chemical reactivity or has no chemical reactivity to the cell electrode active materials.

A second object of the present invention is to provide an electrochemical device having an anode containing magnesium as the active material, a cathode containing sulfur as the active material and a nonaqueous electrolyte system which is of low chemical reactivity or has no chemical reactivity to the electrode active materials.

A third object of the present invention is to provide a method for preparing an electrochemical device having magnesium as an active anode material and a nonaqueous electrolyte system which is of low chemical reactivity or has no chemical reactivity to the cell electrode active materials.

A fourth object of the present invention is to provide a method for preparing an electrochemical device having an anode containing magnesium as the active material, a cathode containing sulfur as the active material and a nonaqueous electrolyte system which is of low chemical reactivity or has no chemical reactivity to the cell electrode active materials.

These and other objects, individually or in combinations thereof, have been achieved by the present invention, a first embodiment of which includes an electrochemical device, comprising:
an anode comprising magnesium;
a cathode stable to a voltage of at least 3.2 V relative to a magnesium reference; and
an electrolyte;
wherein the electrolyte is obtained by admixture of a magnesium salt of a non-nucleophilic base comprising nitrogen and aluminum trichloride in an ether solvent.

A second embodiment of the present invention provides an electrochemical device, comprising:
an anode comprising magnesium;
a cathode stable to a voltage of at least 3.2 V relative to a magnesium reference; and
an electrolyte;
wherein the electrolyte comprises tetrahydrofuran, and an active salt of formula (I)

(I)

A third embodiment of the present invention provides an electrochemical device, comprising:
an anode comprising magnesium;
a cathode containing sulfur; and
an electrolyte;
wherein the electrolyte comprises tetrahydrofuran, and an active salt of formula (I)

(I).

A fourth embodiment of the present invention provides a method for preparing an electrochemical device, comprising:
connecting an anode comprising magnesium and a cathode stable to a voltage of at least 3.2 V relative to a magnesium reference via an external electrically conductive structure; and
contacting the anode and cathode with an electrolyte comprising:
a magnesium salt of a non-nucleophilic base comprising nitrogen;
aluminum trichloride; and
an ether solvent.

A fifth embodiment of the present invention provides a method for preparing an electrochemical device, comprising:
connecting an anode comprising magnesium and a cathode comprising sulfur via an external electrically conductive structure; and contacting the anode and cathode with an electrolyte comprising: tetrahydrofuran, and
an active salt of formula (I)

$$[Mg_2Cl_3\text{-}6(C_4H_8O)]^+[AlCl_3((CH_3)_3Si)_2N)]^- \qquad (I).$$

Applicants have recognized that to successfully prepare a magnesium-sulfur battery or electrochemical device, an effective magnesium ion transport electrolyte system which is stable to reduction on metallic magnesium and not nucleophilically reactive toward sulfur is required. Stability to reduction on magnesium is necessary to prevent formation of passivating films on the surface of the magnesium which inhibit passage of the magnesium ion.

Figure 1:
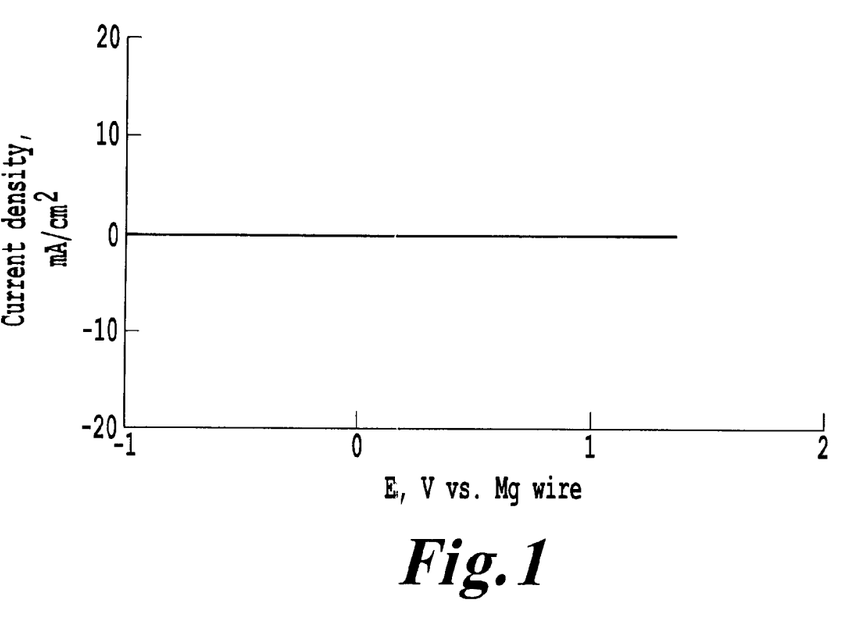
FIG. 1 shows the results of cyclicvoltammogram study of Mg deposition from $Mg(TFSI)_2$.

Applicants investigated the voltammetric behavior of bis(trifluormethylsulfonyl)magnesium chloride described as in JP 2004-265675 and found that this material is not compatible with magnesium and is in fact reduced by magnesium. This behavior is shown in FIG. 1.

Recognizing the above stated requirements, Applicants have searched for possible suitable electrolyte systems and have investigated magnesium salts of non-nucleophilic bases containing nitrogen for utility as components of an electrolyte system for the transport of magnesium ions. Reduced nucleophilicity of a nitrogen containing base may be a result of electron delocalization or steric hindrance. Sterically hindered non-nucleophilic amine bases include diisopropyl amine, tetramethylpiperidine and hexamethyldisilylamine.

Hexamethyl disalazide magnesium chloride is known to reversibly deposit and dissolve Mg. Liebenow et al. (Electrochem. Corn. 2000, 641-645) describe a high reoxidation efficiency of magnesium electrodeposited from solutions of organomagnesium halides and amidomagnesium halides. Conductivity data in THF for N-methylanilylmagnesium bromide, pyrrylmagnesium bromide and bis(trimethylsilyl)magnesium chloride (hexamethyl disalazide magnesium chloride) was reported along with a cyclic voltammogram for bis(trimethylsilyl)magnesium chloride. However, it was reported that a complete reoxidation of magnesium deposited from bis(trimethylsilyl)-magnesium chloride could not be achieved and some percent of electrochemical active magnesium was lost per cycle.

The present inventors investigated the electrolytic behavior of bis(trimethylsilyl)imido magnesium chloride in comparison to a conventional phenylmagnesium chloride/AlCl$_3$ electrolyte in THF solution. Analysis of cyclic voltammetry data showed that the coulombic efficiency (CE) of Mg deposition/dissolution was 100% at three different scan rates (5, 25 and 100 m V/sec).

Figure 2:
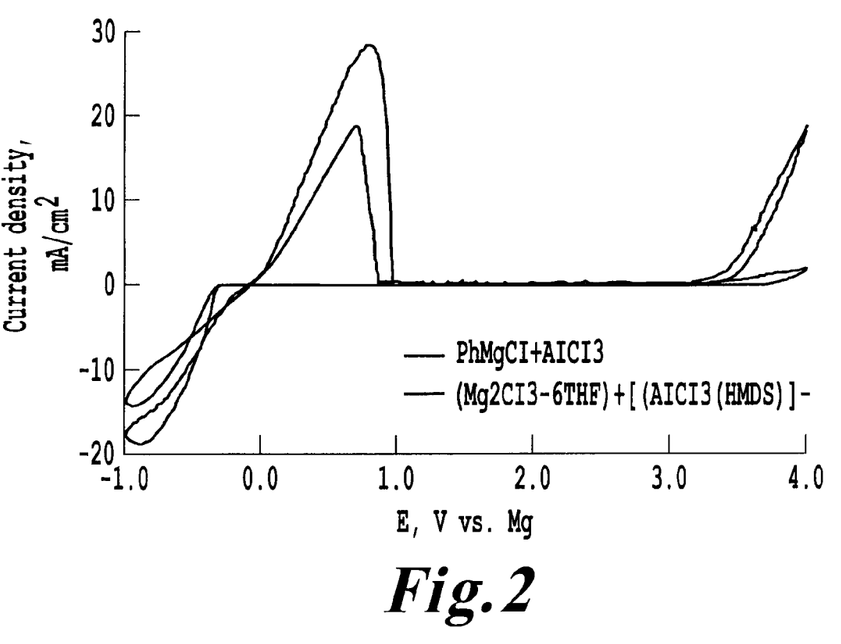
FIG. 2 shows the cyclicvoltammogram study of $(Mg_{2l\ THF})^+[AlCl_3(HMDS)]^-$ in comparison to ($PhMgCl+AlCl_3$).

Hexamethyl disalazide magnesium chloride (HMDSMC) had a higher Mg deposition overpotential and lower current density compared to the conventional Mg electrolyte. The inset portion of FIG. 2 shows the Mg deposition overpotential is −0.40V for HMDSMC while the overpotential for the conventional system is −0.33V. Unexpectedly, the Inventors discovered that when aluminum chloride is combined with the HMDSMC, the performance of the system was significantly improved. As shown in FIG. 2, addition of AlCl$_3$ to HMDSMC resulted in a decrease of the Mg deposition overpotential from −0.40 to −0.29 V, thus making it comparable to the −0.33 value of the conventional system. Thus, the new HMDSMC/AlCl$_3$ electrolyte shows higher current density and lower overpotential compared to HMDSMC or PhMgCl+ AlCl$_3$. This means that HMDSMC/AlCl$_3$ electrolyte may likely result in higher cell voltage and therefore higher energy density when adapted in a practical battery system.

Applicants have further investigated the HMDSMC/AlCl$_3$ electrolyte and have isolated a crystalline material which is electrochemically active. The isolated material was identified as having the chemical structure of formula (I):

$$[Mg_2Cl_3\text{-}6(C_4H_8O)]^+[AlCl_3((CH_3)_3Si)_2N)]^- \qquad (I).$$

Figure 3:
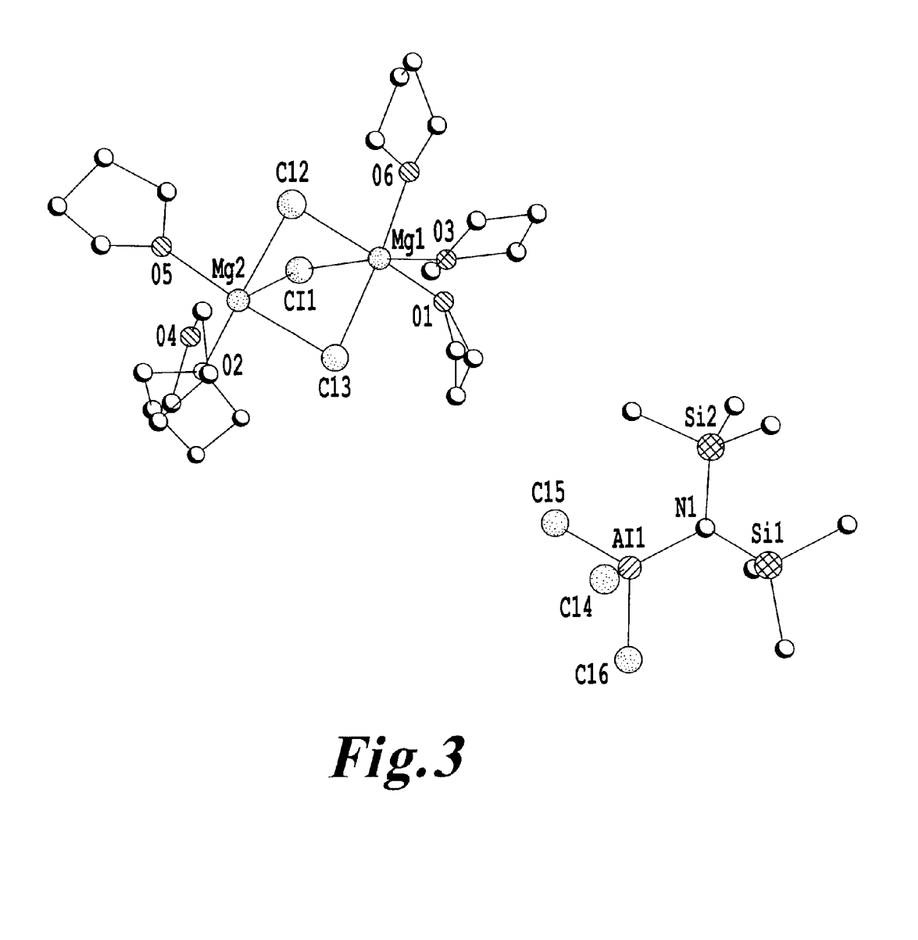
FIG. 3 shows the crystal structure of $(Mg_2Cl_3 \cdot 6THF)^+[AlCl_3(HMDS)]^+$.

X-ray diffraction analysis indicates the structure of the magnesium cation specie is a symmetric dimer as shown in FIG. 3. When the crystalline material was redissolved in fresh THF, reversible Mg deposition and dissolution was observed.

Figure 5:
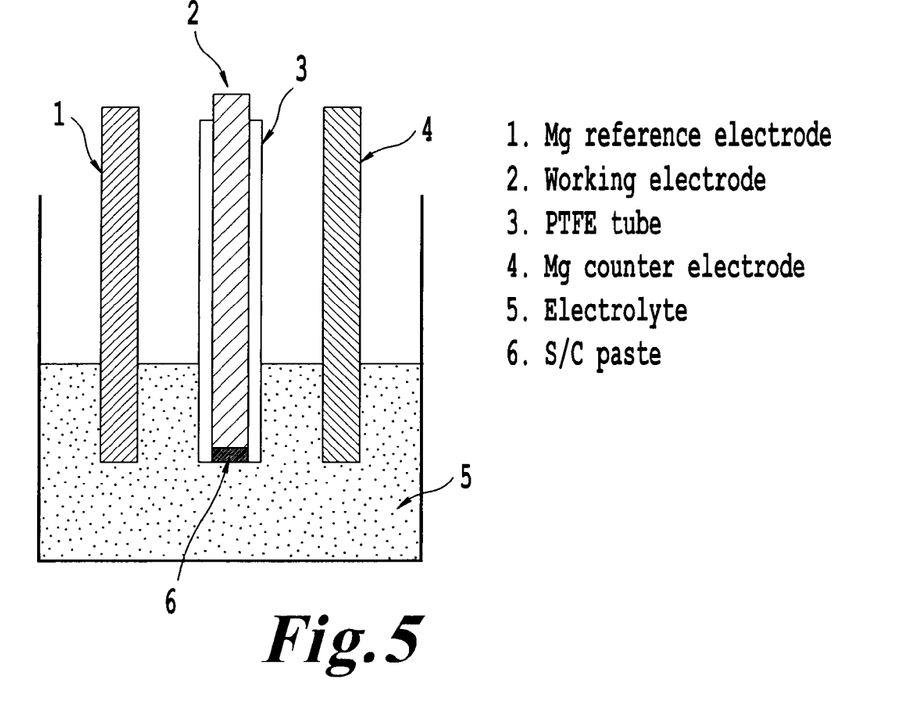
FIG. 5 shows a diagram of the MgS electrochemical device of Example 7.
Figure 6:
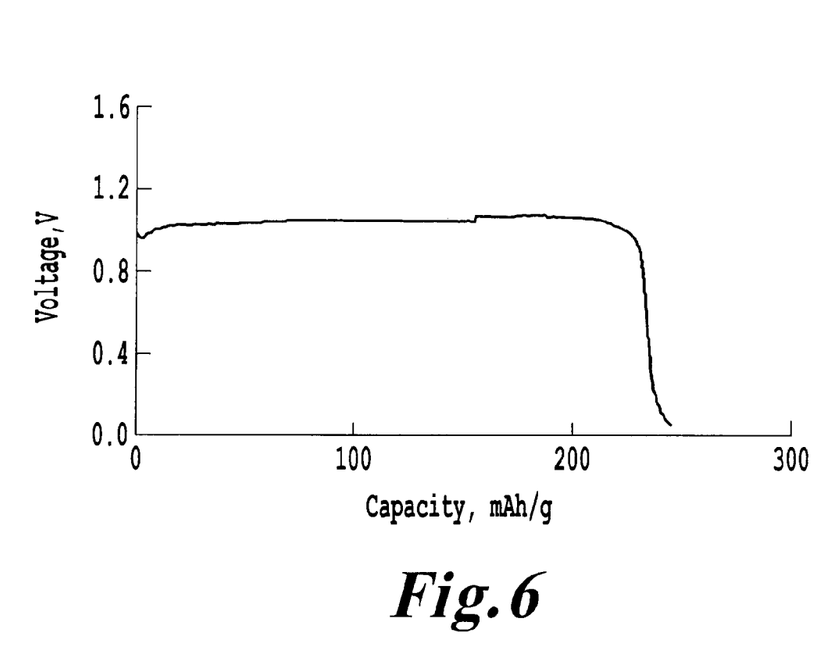
FIG. 6 shows the electrochemical performance of the electrochemical device of Example 7.

An electrochemical cell as shown in FIG. 5 was constructed as described in Example 7, and the electrochemical performance of the 3-electrode cell is shown in FIG. 6. As shown in FIG. 6 the discharge behavior of the sulfur electrode demonstrates that a functional magnesium sulfur battery containing an electrolyte system according to the invention is feasible.

Based on these unexpected results, the inventors have discovered a Mg electrolyte system which is significantly reduced in chemical activity, both as a nucleophile and as a reducing agent, while being at least equivalent in electrolyte performance to conventionally known systems. As shown in FIG. 2 the claimed electrolyte system is compatible with any cathode active material which is stable to a voltage of at least 3.2 V relative to a magnesium reference.

Examples of cathode active materials according to the invention may include sulfur, MnO$_2$ and a Chevrel compound having a formula Mg$_x$Mo$_6$T$_n$, wherein x is a number from 0 to 4, T is sulfur, selenium or tellurium, and n is 8.

A MnO$_2$ cathode is known in the art and is described for example in JP2007-233134.

Chevrel compounds having a formula Mg$_x$Mo$_6$T$_n$, wherein x is a number from 0 to 4, T is sulfur, selenium or tellurium are described in NATURE, 407, Oct. 12, 2000,724-726.

Cathodes containing sulfur as the active ingredient are known in the art and are described for example in U.S. Pat. No. 6,733,924, U.S. Pat. No. 7,029,796 and U.S. Pre-Grant Publication No. 2009/0226809.

Importantly, sulfur is such a cathode active material and the invention therefore allows for the construction of an electrochemical device having sulfur as the active ingredient of a cathode. At the same time, the electrolyte system of the present invention is equal to conventional systems as a Mg ion electrolyte with an anode containing magnesium as the active ingredient.

Accordingly, a functional Mg/S electrochemical device may be constructed according to the present invention.

Therefore, the present invention provides an electrochemical device comprising an anode containing magnesium, a cathode stable to a voltage of at least 3.2 V relative to a magnesium reference and an electrolyte obtained by admixture of a magnesium salt of a non-nucleophilic base comprising nitrogen and aluminum trichloride in an ether solvent. The non-nucleophilic base comprising nitrogen may be a sterically hindered secondary amine or an aromatic heterocyclic nitrogen system. Preferably the non-nucleophilic base comprising nitrogen may be at least one sterically hindered secondary amine selected from the group consisting of diisopropylamine, tetramethylpiperidine and hexamethyldisilylamine. Most preferably, the non-nucleophilic base comprising nitrogen may be hexamethyldisilylamine. Without being constrained by theory, the Inventors believe that the presence of 2 bulky trimethyl silane groups on the disalazide N inhibits nucleophilic approach of the electron rich N to a nucleophile receptive center.

The magnesium salt of the non-nucleophilic base comprising nitrogen may preferably be a magnesium halide salt in consideration of availability, cost and ease of handling. Most preferably the halide may be chloride or bromide and the chloride may especially be preferred for the above reasons.

The ether solvent may be one or more of tetrahydrofuran, ethylene glycol dimethyl ether and bis 2-methoxy ethyl ether in consideration of utility in a battery, safety and ease of handling. Tetrahydrofuran may be most preferred, although battery construction and requirements may dictate the necessity for an ether with different physical properties.

The anode containing magnesium as the active ingredient may be of any form known to one of ordinary skill in the art which is suitable for an electrochemical device according to the present invention.

In a particularly preferred embodiment, the present invention provides an electrochemical device having a cathode containing sulfur as an active ingredient, an anode having magnesium as the active ingredient and the electrolyte system comprising an electrolyte comprising an ether solvent (A) and a salt of formula (II)

$$[Mg_2Cl_3\cdot6(A)]^+[AlCl_3(B)]^- \qquad (II)$$

wherein (B) is an anion of a non-nucleophilic base, wherein the ether solvent is one from the group described above and the non-nucleophilic base is at least one sterically hindered secondary amine selected from the group consisting of diisopropylamine, tetramethylpiperidine and hexamethyldisilylamine.

In a particularly preferred embodiment of the present invention, the electrochemical device may have a cathode containing sulfur as an active ingredient, an anode having magnesium as the active ingredient and an electrolyte system comprising tetrahydrofuran as the ether solvent and a salt of formula (I)

$$[Mg_2Cl_3\cdot6(C_4H_8O)]^+[AlCl_3((CH_3)_3Si)_2N)]^- \qquad (I).$$

The electrochemical device according to the invention may be constructed by methods which are conventionally known. In general the method may include connecting an anode comprising magnesium and a cathode stable to a voltage of at least 3.2 V relative to a magnesium reference via an external electrically conductive structure; and contacting the anode and cathode with an electrolyte comprising: a magnesium salt of a non-nucleophilic base comprising nitrogen; aluminum trichloride; and an ether solvent.

Having generally described this invention, a further understanding can be obtained by reference to certain specific examples which are provided herein for purposes of illustration only and are not intended to be limiting unless otherwise specified. Skilled artisans will recognize the utility of the devices of the present invention as a battery as well as the general utility of the electrolyte system described herein.

EXAMPLES

Example 1

In a glovebox, 1.574 ml of a 1.27 M solution of hexamethyl disalazide magnesium chloride in THF was added to 1.426 ml of dried THF in a screw capped vial. The resulting mixture was rapidly stirred. The solution was then allowed to stand for a few minutes and after standing, 2 ml of 0.5 M AlCl$_3$ (0.5 eq) in THF was added. This mixture was stirred for 48 hours.

Example 2

In a glovebox, 3.17 ml of a 1.27 M solution of bishexamethyl disalazide magnesium in THF was added to 1.426 ml of dried THF in a screw capped vial. The resulting mixture was rapidly stirred. The solution was then allowed to stand for a few minutes and after standing, 2 ml of 0.5 M AlCl$_3$ (0.5 eq) in THF was added. This mixture was stirred for 48 hours.

Example 3

A Mg/S battery was prepared using a test cell (Japan Tomcell). To fabricate the sulfur cathode, a mixture of sulfur and carbon was ball-milled and mixed with water and PTFE resin. The resulting ink was applied to aluminum foil by doctor blade method. The battery was assembled to contain Mg foil as a negative electrode, the sulfur coated aluminum foil as a positive electrode and a glass filter as separator. The electrolyte solutions prepared in Examples 1 and 2 were added to the cell to complete formation of a battery. A discharge test of the battery was conducted at a constant current of 50 µA till the battery voltage was lowered to 0.1V. The discharge capacity of the battery was measured to be 241 mAh/g.

Example 4

The following THF solutions were prepared:

0.40 M PhMgCl/0.2 M AlCl$_3$
0.40 M ((CH$_3$)$_3$Si)$_2$NMgCl 0.40 M ((CH$_3$)$_3$Si)$_2$NMgCl/0.2 M AlCl$_3$

Cyclicvoltammograms of each solution were obtained at a scan rate of 25 mV/sec employing a Pt disk as Working electrode; Mg wire as reference electrode and Mg ribbon as counter electrode.

The three cyclicvoltammograms are shown in FIG. 2. The inset enlarges the region between −0.1V and −0.5 V and clearly shows that the Mg deposition overpotential of the electrolyte system according to the present invention (0.40 M ((CH$_3$)$_3$Si)$_2$NMgCl/0.2 M AlCl$_3$) is decreased from −0.4V to −0.29V. The claimed electrolyte combination is thus comparable in performance to conventional Grignard electrolytes.

Example 5

Figure 4:
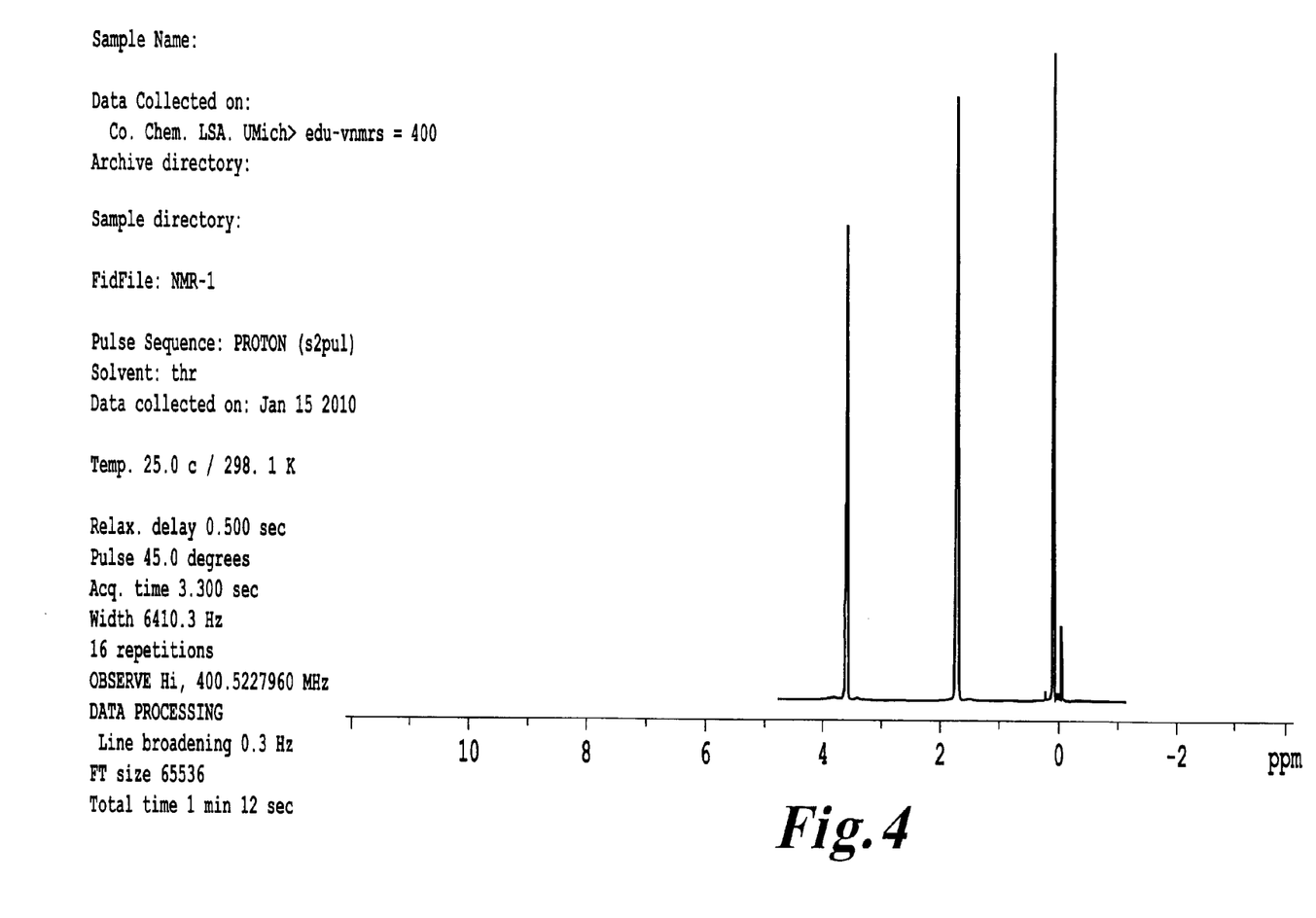
FIG. 4 shows the NMR spectrum of the crystalline solid isolated in Example 5.

In a drybox, 15 ml of 0.5 M solution of aluminum trichloride (7.5 mmol) in THF was added to 50 ml flask. The aluminum trichloride solution was treated with 2 eq of 1.44 M THF solution of hexamethlydisilazide (HMDS)MgCl (10.417 ml, 15 mmol)(Synthonix, Inc.). The flask was capped and stirred rapidly for 48 hrs. The solution was transferred to 125 ml conical flask, The THF solution was layered with dry hexane (Aldrich, 80 ml). After 3 days, the white crystals were filtered and washed with hexane (30 ml) and vacuum dried to furnish 4.3 g of white crystalline material. The $^1$H NMR spectrum is shown in FIG. 4. When redissolved in fresh THF reversible Mg deposition and dissolution was observed.

Example 6

Structure Determination of Mg Electrolyte

Colorless blocks of the crystalline material obtained in Example 5 were crystallized from a THF/hexanes solution at 23° C. A crystal of dimensions 0.44×0.44×0.42 mm was mounted on a standard Bruker SMART-APEX CCD-based X-ray diffractometer[1] equipped with a low temperature device and fine focus Mo-target X-ray tube (λ=0.71073 A) operated at 1500 W power (50 kV, 30 mA). The X-ray intensities were measured at 85(2) K; the detector was placed at a distance 5.055 cm from the crystal. A total of 3484 frames were collected with a scan width of 0.5° in ω and 0.45° in φ with an exposure time of 5 s/frame. The frames were integrated with the Bruker SAINT software package[2] with a narrow frame algorithm. The integration of the data yielded a total of 141417 reflections to a maximum $2\theta$ value of 56.70° of which 12134 were independent and 10582 were greater than $2\sigma(1)$. The final cell constants (Table 1) were based on the xyz centroids of 9385 reflections above $10\sigma(1)$. Analysis of the data showed negligible decay during data collection; the data were processed with SADABS and corrected for absorption. The structure was solved and refined with the Bruker SHELXTL (version 2008/4) software package[3], using the space group P2(1)/c with Z=4 for the formula $C_{34}H_{74}NO_7Mg_2AlSi_2Cl_6$. All non-hydrogen atoms were refined anisotropically with the hydrogen atoms placed in idealized positions. Full-matrix least-squares refinement based on $F^2$ converged at R1=0.0381 and wR2=0.0944 [based on I>2sigma(I)], R1=0.0454 and wR2=0.0997 for all data. Additional details are presented in Table 1.

1) Sheldrick, G. M. SHELXTL, v. 2008/4; Bruker Analytical X-ray, Madison, Wis., 2008.
2) Saint Plus, v. 7.60A, Bruker Analytical X-ray, Madison, Wis., 2009.
3) Sheldrick, G. M. SADABS, v. 2008/1. Program for Empirical Absorption Correction of Area Detector Data, University of Gottingen: Gottingen, Germany, 2008.

The detailed structure is shown in FIG. 3 and is represented by the formula:

$(Mg_2Cl_3 \cdot 6THF)^+ AlCL_3N(Si(CH_3)_3)_2$

TABLE 1

| Crystal data and structure refinement for $(Mg_2Cl_3-6THF)^+ [AlCl_3(HMDS)]^-$ | |
|---|---|
| Identification code | $(Mg_2Cl_3-6THF)^+ [AlCl_3(HMDS)]^-$ |
| Empirical formula | C34H74AlCl6Mg2NO7Si2 |
| Formula weight | 953.42 |
| Temperature | 85(2) K |
| Wavelength | 0.71073 Å |
| Crystal system, space group | Monoclinic, P2(1)/c |
| Unit cell dimensions | a = 11.4990(9) Å    alpha = 90 deg. |
| | b = 13.9442(11) Å    beta = 92.747(1) deg. |
| | c = 30.469(3) Å    gamma = 90 deg. |
| Volume | 4879.9(7) Å$^3$ |
| Z, Calculated density | 4, 1.298 Mg/m$^3$ |
| Absorption coefficient | 0.486 mm$^{-1}$ |
| F(000) | 2032 |
| Crystal size | 0.44 × 0.44 × 0.42 mm |
| Theta range for data collection | 1.77 to 28.30 deg. |
| Limiting indices | $-15 \leq h \leq 15, -18 \leq k \leq 18,$ |
| | $-40 \leq l \leq 40$ |
| Reflections collected/unique | 141417/12134 [R(int) = 0.0326] |
| Completeness to theta = 28.30 | 99.9% |
| Absorption correction | Semi-empirical from equivalents |
| Max. and min. transmission | 0.8219 and 0.8145 |
| Refinement method | Full-matrix least-squares on $F^2$ |
| Data/restraints/parameters | 12134/16/529 |
| Goodness-of-fit on $F^2$ | 1.047 |
| Final R indices [I > 2sigma(I)] | R1 = 0.0381, wR2 = 0.0944 |
| R indices (all data) | R1 = 0.0454, wR2 = 0.0997 |
| Largest diff. peak and hole | 0.674 and -0.406 e · A$^{-3}$ |

Example 7

All reagents were purchased from Synthonix. In a drybox, 15 ml of 0.5 M solution of aluminum trichloride (7.5 mmol) in THF was added to 50 mL flask. The aluminum trichloride solution was treated with 2 eq of 1.44 M THF solution of hexamethyldisilazide (HMDS)MgCl (10.417 mL, 15 mmol). The flask was capped and stirred rapidly for 48 hrs. The solution was transferred to 125 mL conical flask, and the THF solution was layered with dry hexane (Aldrich, 80 mL). After 3 days, the white crystals were filtered and washed with hexane (30 mL) and vacuum dried to furnish 4.3 g of $(Mg_2C_{13}\text{-}6THF)^+[AlCl_3(HMDS)]^-$ (65%).

The white crystal was dissolved in THF to make 0.2M solution, and was used as the electrolyte in the 3-electrode cell shown in FIG. 5. The working electrode of this 3-electrode cell was made from a paste comprising elemental sulfur and finely divided carbon. The reference electrode and counter electrode were made from Mg metal. Using this cell, the electrochemical performance of the sulfur electrode in $(Mg_2C_{13}\text{-}6THF)^+[AlCl_3(HMDS)]^-$ was obtained as shown in FIG. 6. The discharge behavior of the sulfur electrode in the $(Mg_2C_{13}\text{-}6THF)^+[AlCl_3(HMDS)]^-$ electrolyte shown in FIG. 6 demonstrates the feasibility of a magnesium sulfur battery with the $(Mg_2Cl_3\text{-}6THF)^+[AlCl_3(HMDS)]^-$ electrolyte.

The invention claimed is:

1. An electrochemical device, comprising:
    an anode comprising magnesium;
    a cathode stable to a voltage of at least 3.2 V relative to a magnesium reference; and
    a non-nucleophilic electrolyte;
    wherein
    the electrolyte comprises an electrochemically active salt of a solvated cation species, prepared in a medium, the salt comprising a magnesium ion dimer of formula (III):

$[Mg_7Cl_3]^+$     (III)

and
    an anion of formula (IV):

$[AlCl_3(B)]^-$     (IV)

the electrochemically active salt having been crystallized and removed from the medium of preparation and redissolved in an ether solvent to obtain the electrolyte,
    wherein
    B is a non-nucleophilic base comprising nitrogen.

2. The electrochemical device according to claim 1, wherein the non-nucleophilic base comprising nitrogen is a sterically hindered secondary amine or an aromatic heterocyclic nitrogen system.

3. The electrochemical device according to claim 2, wherein the non-nucleophilic base comprising nitrogen is at least one sterically hindered secondary amine selected from the group consisting of diisopropylamine, tetramethylpiperidine and hexamethyldisilylamine.

4. The electrochemical device according to claim 1, wherein the ether solvent is selected from the group consisting of tetrahydrofuran, ethylene glycol dimethyl ether and bis 2-methoxy ethyl ether.

5. The electrochemical device according to claim 4, wherein the ether is tetrahydrofuran.

6. The electrochemical device according to claim 1, wherein
    the ether solvent is tetrahydrofuran, and
    the electrolyte comprises an active salt of formula (I)

$[Mg_2Cl_3\text{-}6(C_4H_8O)]^+[AlCl_3((CH_3)_3Si)_2N)]^-$     (I).

7. The electrochemical device according to claim 1, wherein
    the electrochemically active salt is obtained by a method comprising admixture of a magnesium salt of a non-nucleophlic base comprising nitrogen and aluminum trichloride in an ether solvent in a molar ratio of the magnesium salt of a non-nucleophilic base comprising nitrogen to the aluminum trichloride of from 3/2 to 5/1.

8. The electrochemical device according to claim 1, wherein the cathode stable to a voltage of at least 3.2 V relative to a magnesium reference comprises sulfur.

9. The electrochemical device according to claim 8, wherein the cathode comprising sulfur comprises elemental sulfur.

10. The electrochemical device according to claim 9, wherein the cathode comprising elemental sulfur further comprises a divided carbon.

11. A method for preparing an electrochemical device, comprising:

connecting an anode comprising magnesium and a cathode stable to a voltage of at least 3.2 V relative to a magnesium reference via an external electrically conductive structure; and contacting the anode and cathode with a non-nucleophilic electrolyte wherein the electrolyte comprises an electrochemically active salt of a solvated cation specie, prepared in a medium, the salt comprising a magnesium ion dimer of formula (III):

$$[Mg_9Cl_3]^+ \quad (III)$$

and an anion of formula (IV):

$$[AlCl_3(B)]^- \quad (IV)$$

the electrochemically active salt having been crystallized and removed from the medium of preparation and redissolved in an ether solvent to obtain the electrolyte, wherein B is a non-nucleophilic base comprising nitrogen.

12. The method according to claim 11, wherein the the non-nucleophilic base comprising nitrogen is hexamethyldisilylamine and the ether solvent is tetrahydrofuran.

13. The method according to claim 11, wherein the electrolyte is obtained by combining a magnesium salt of a non-nucleophilic base comprising nitrogen with aluminum trichloride in a molar ratio of the magnesium salt of a non-nucleophilic base comprising nitrogen to the aluminum trichloride of from 3/2 to 5/1.

14. The method according to claim 11, wherein the cathode stable to a voltage of at least 3.2 V relative to a magnesium reference comprises elemental sulfur.

* * * * *